United States Patent
Kim

(10) Patent No.: US 10,208,791 B2
(45) Date of Patent: Feb. 19, 2019

(54) CENTER BEARING BUSH UNIT FOR PROPELLER SHAFT

(71) Applicants: Hyundai Motor Company, Seoul (KR); Kia Motors Corporation, Seoul (KR)

(72) Inventor: Jang Ho Kim, Hwaseong-su (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/693,797

(22) Filed: Sep. 1, 2017

(65) Prior Publication Data

US 2017/0363141 A1 Dec. 21, 2017

Related U.S. Application Data

(62) Division of application No. 14/802,128, filed on Jul. 17, 2015, now Pat. No. 9,765,813, which is a division
(Continued)

(30) Foreign Application Priority Data

Dec. 31, 2012 (KR) .......................... 10-2012-0158056

(51) Int. Cl.
*F16C 27/06* (2006.01)
*F16F 1/38* (2006.01)
(Continued)

(52) U.S. Cl.
CPC ............ *F16C 27/06* (2013.01); *F16C 27/066* (2013.01); *F16F 1/3828* (2013.01); *F16F 15/08* (2013.01); *F16C 19/06* (2013.01); *F16C 2326/06* (2013.01)

(58) Field of Classification Search
CPC .......... F16C 19/06; F16C 27/04; F16C 27/06; F16C 27/066; F16C 27/08; F16C 2326/06;
(Continued)

(56) References Cited

U.S. PATENT DOCUMENTS 2,155,919 A 4/1939 Wooler
3,856,325 A 12/1974 Willetts
(Continued)

FOREIGN PATENT DOCUMENTS

DE 102012208055 A1 11/2013
JP 2006-200670 A 8/2006
(Continued)

*Primary Examiner* — Adam D Rogers
(74) *Attorney, Agent, or Firm* — Morgan, Lewis & Bockius LLP

(57) ABSTRACT

A center bearing bush unit for a propeller shaft can effectively decrease the amount of large/small displacement that occurs in the propeller shaft during driving of a vehicle. A center bearing bush unit for a propeller shaft includes an inner pipe; an outer pipe disposed on a common axis as the inner pipe at the outside of the inner pipe; a cushion rubber attached between the inner and outer pipes, and having a plurality of voids disposed on the common axis; and a plurality of stoppers attached to the outer circumferential surface of the inner pipe while being spaced apart from the cushion rubber at a predetermined interval.

4 Claims, 14 Drawing Sheets

Related U.S. Application Data of application No. 14/010,388, filed on Aug. 26, 2013, now Pat. No. 9,261,138.

(51) Int. Cl.
*F16F 15/08* (2006.01)
*F16C 19/06* (2006.01)

(58) Field of Classification Search
CPC ... B60K 5/1208; B60K 5/1291; F16F 1/3828; F16F 15/08
See application file for complete search history.

(56) References Cited

U.S. PATENT DOCUMENTS

| | | |
|---|---|---|
| 4,084,801 A | 4/1978 | Landers |
| 4,364,613 A | 12/1982 | Mangiavacchi |
| 4,430,066 A | 2/1984 | Benassi |
| 4,708,499 A | 11/1987 | Loser |
| 4,722,618 A | 2/1988 | Matsumoto et al. |
| 4,960,334 A | 10/1990 | Mazziotti |
| 5,314,255 A | 5/1994 | Schwerdt |
| 5,501,531 A | 3/1996 | Hamaekers |
| 5,551,783 A | 9/1996 | Whitney |
| 5,829,892 A | 11/1998 | Groves |
| 6,634,793 B2 | 10/2003 | Zimmermann |
| 7,044,646 B1 | 5/2006 | Aiken |
| 7,637,666 B2 | 12/2009 | Schmid |
| 7,670,054 B2 | 3/2010 | Fedotov et al. |
| 8,186,641 B2 | 5/2012 | Valovick |
| 8,573,850 B2 | 11/2013 | Reihle et al. |
| 9,175,739 B2 | 11/2015 | Ohnishi |
| 2017/0363142 A1* | 12/2017 | Kim .................. F16C 27/06 |

FOREIGN PATENT DOCUMENTS

| | | |
|---|---|---|
| JP | 2006-250251 A | 9/2006 |
| WO | WO 2005078293 A1 | 8/2005 |

\* cited by examiner

CENTER BEARING BUSH UNIT FOR PROPELLER SHAFT

CROSS-REFERENCE TO RELATED APPLICATION

The present application is a Divisional of U.S. patent application Ser. No. 14/802,128, filed Jul. 17, 2015, which is a Divisional of U.S. patent application Ser. No. 14/010,388, filed Aug. 26, 2013, which claims priority of Korean Patent Application Number 10-2012-0158056 filed Dec. 31, 2012, the entire contents of which applications are incorporated herein for all purposes by these references.

BACKGROUND OF INVENTION

Field of Invention

The present invention relates to a center bearing bush unit for a propeller shaft. More particularly, the present invention relates to a center bearing bush unit for a propeller shaft, which can effectively decrease the amount of large/small displacement that occurs in the propeller shaft during driving of a vehicle.

Description of Related Art

In general, a rear-wheel or four-wheel drive vehicle has a propeller shaft that transmits power output from an engine up to a differential via a transmission. In a case where the length of the propeller shaft is long, the propeller shaft is formed into a two-piece structure. In the two-piece structure, a center bearing bush unit assembled with a body of the vehicle is provided at a central portion of the propeller shaft.

FIG. 1 is a configuration view showing a partial section of a center bearing bush unit for a propeller shaft according to a related art.

As shown in FIG. 1, the center bearing bush unit 20 according to the related art is mounted between a center bearing 21 and a mounting bracket 23 so as to reduce the movement of a propeller shaft 27 and to attenuate vibrations. Simultaneously, the center bearing bush unit 20 prevents friction between the center bearing 21 and the mounting bracket 23.

However, the center bearing bush unit 20 is made of a rubber material having a simple shape. Therefore, the center bearing bush unit 20 does not effectively absorb movements and vibrations of the propeller shaft 27 with respect to large and small displacements caused during driving of a vehicle.

Particularly, in a case where a large-displacement movement of the propeller shaft 27 occurs in sudden start or acceleration of the vehicle, the center bearing bush unit 20 does not effectively reduce the amount of movement of the propeller shaft 27, and hence the movement of the propeller shaft 27 is transmitted to a vehicle body as it is. Therefore, the ride comfort of the vehicle is deteriorated, and the fatigue degree of the center bearing bush unit 20 is increased, thereby deteriorating the durability of the center bearing bush unit 20.

Accordingly, Korean Patent Application Publication No. 2011-38505 has disclosed a center bearing bush unit for a propeller shaft in order to decrease large- and small-displacement movements of the propeller shaft.

In Korean Patent Application Publication No. 2011-38505, as shown in FIGS. 2 and 3, the center bearing bush unit 10 is mounted between a center bearing 7 mounted to a propeller shaft 1 and a mounting bracket 9 fixed to a vehicle body frame while surrounding the center bearing 7. The center bearing bush unit 10 is configured with a bush body 11 provided by integrally forming a projection 13, first/second modified guide grooves 15 and 17 and a rib stopper 19. One will appreciate that such integral components may be monolithically formed. Thus, the center bearing bush unit 10 decreases small- and large-displacement movements of the propeller shaft 1, caused during driving of a vehicle.

However, the center bearing bush unit 10 has a complicated shape, and therefore, the tuning of the center bearing bush unit 10 is difficult when a change in characteristic of the center bearing bush unit 10 is required due to a change in operational environment.

In addition, the durability of the first/second modified guide grooves 15 and 17 is structurally weak, and therefore, it is highly likely that cracks may occur in a test for the durability of the center bearing bush unit 10. Since upper and lower gaps A and B are identical to each other, based on FIG. 3, it is difficult to absorb the amount of displacement caused by the weight of the propeller shaft. Therefore, the vibration insulation performance is degraded due to the difference in rigidity between upper and lower portion of the center bearing bush unit.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a center bearing bush unit for a propeller shaft, in which a cushion rubber for decreasing the amount of small-displacement movement of the propeller shaft and a stopper for decreasing the amount of large-displacement movement of the propeller shaft are independently configured, and the center bearing bush unit is formed into a simple structure in which its tuning is easily performed, so that it is possible to effectively decrease the amount of large/small displacement of the propeller shaft, caused during driving of a vehicle.

Various aspects of the present invention provide for a center bearing bush unit for a propeller shaft, including: an inner pipe; an outer pipe disposed on the same axle as the inner pipe at the outside of the inner pipe; a cushion rubber attached between the inner and outer pipes, and having a plurality of voids disposed on the same axle; and a plurality of stoppers attached to the outer circumferential surface of the inner pipe while being spaced apart from the cushion rubber at a predetermined interval.

The stopper may be configured with inner and outer stoppers having different diameters. One end portion of the inner stopper may be inserted into the inner void of the cushion rubber in a state in which the inner circumferential surface of the inner stopper is attached to the outer circumferential surface of the inner pipe, and one end portion of the outer stopper may be inserted into the outer void of the cushion rubber in a state in which the inner circumferential surface of the outer stopper is attached to the outer circumferential surface of the inner pipe.

Various aspects of the present invention provide for a center bearing bush unit for a propeller shaft, including: an inner pipe; an outer pipe disposed on the same axle as the inner pipe at the outside of the inner pipe; a cushion rubber attached between the inner and outer pipes, and having a plurality of voids disposed on the same axle; and a plurality of stoppers attached to the inner circumferential surface of the outer pipe while being spaced apart from the cushion rubber at a predetermined interval.

The stopper may be configured with inner and outer stoppers having different inside diameters. One end portion of the inner stopper may be inserted into the inner void of the cushion rubber in a state in which the outer circumferential surface of the inner stopper is attached to the inner circumferential surface of the outer pipe, and one end portion of the outer stopper may be inserted into the outer void of the cushion rubber in a state in which the outer circumferential surface of the outer stopper is attached to the inner circumferential surface of the outer pipe.

Various aspects of the present invention provide for a center bearing bush unit for a propeller shaft, including: an inner pipe; an outer pipe disposed on the same axle as the inner pipe at the outside of the inner pipe; a cushion rubber attached between the inner and outer pipes, and having a plurality of voids disposed on the same axle; an inner stopper attached to the outer circumferential surface of the inner pipe while being spaced apart from the cushion rubber at a predetermined interval; and an outer stopper attached to the inner circumferential surface of the outer pipe while being spaced apart from the cushion rubber at a predetermined interval.

One end portion of the inner stopper may be inserted into the inner void of the cushion rubber in a state in which the inner circumferential surface of the inner stopper is attached to the outer circumferential surface of the inner pipe, and one end portion of the outer stopper may be inserted into the outer void of the cushion rubber in a state in which the outer circumferential surface of the outer stopper is attached to the inner circumferential surface of the outer pipe.

Various aspects of the present invention provide for a center bearing bush unit for a propeller shaft, including: an inner pipe; an outer pipe disposed on the same axle as the inner pipe at the outside of the inner pipe; a cushion rubber attached between the inner and outer pipes, and having a plurality of voids disposed on the same axle; an outer stopper attached to the outer circumferential surface of the inner pipe while being spaced apart from the cushion rubber at a predetermined interval; and an inner stopper attached to the inner circumferential surface of the outer pipe while being spaced apart from the cushion rubber at a predetermined interval.

One end portion of the inner stopper may be inserted into the inner void of the cushion rubber in a state in which the outer circumferential surface of the inner stopper is attached to the inner circumferential surface of the outer pipe, and one end portion of the outer stopper may be inserted into the outer void of the cushion rubber in a state in which the inner circumferential surface of the outer stopper is attached to the outer circumferential surface of the inner pipe.

The voids provided in the cushion rubber may be formed to have the same width, or may be formed to have selected two or more different widths.

The void may be provided with an inner void formed adjacent to the inner circumferential surface of the cushion rubber, and an outer void formed adjacent to the outer circumferential surface of the cushion rubber.

The inner and outer stoppers may be formed to have different thicknesses, or may be formed to have the same thickness.

The cushion rubber may have a plurality of openings arranged in the circumferential direction thereof. The cushion rubber may have a predetermined thickness in the circumferential direction thereof, or may have a variable thickness variably formed.

At least one of the inner and outer stoppers may have a plurality of openings arranged in the circumferential direction thereof. The at least one of the inner and outer stoppers may have a predetermined thickness in the circumferential direction thereof, or may have a variable thickness variably formed.

In the center bearing bush unit for the propeller shaft according to the present invention, the vibration insulation zone or rigidity characteristic zone of vibrations of various displacements is subdivided and expanded according to displacement conditions, thereby effectively insulating vibrations. When a change in characteristic is required due to a change in operational environment, it is possible to easily tune the center bearing bush unit The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
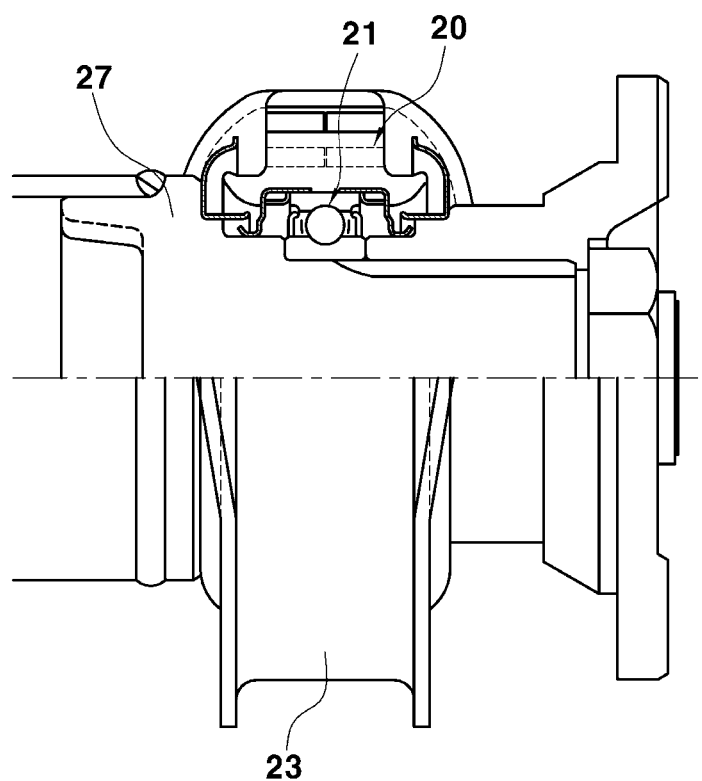
FIG. 1 is a configuration view showing a partial section of a center bearing bush unit for a propeller shaft according to a related art.
Figure 2:
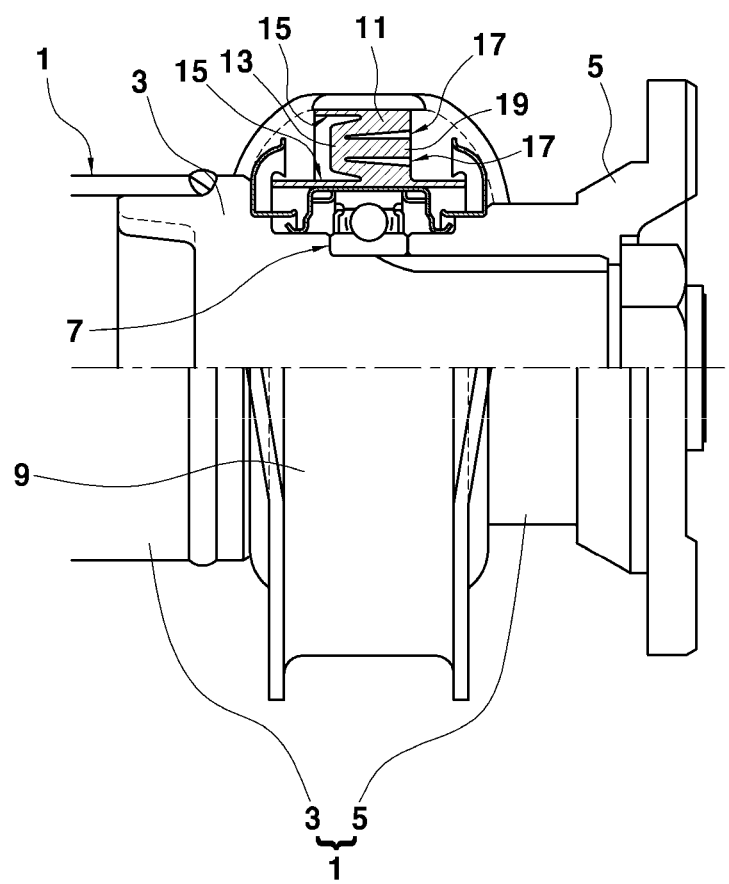
FIG. 2 is a configuration view showing a partial section of a center bearing bush unit for a propeller shaft according to another related art.
Figure 3:
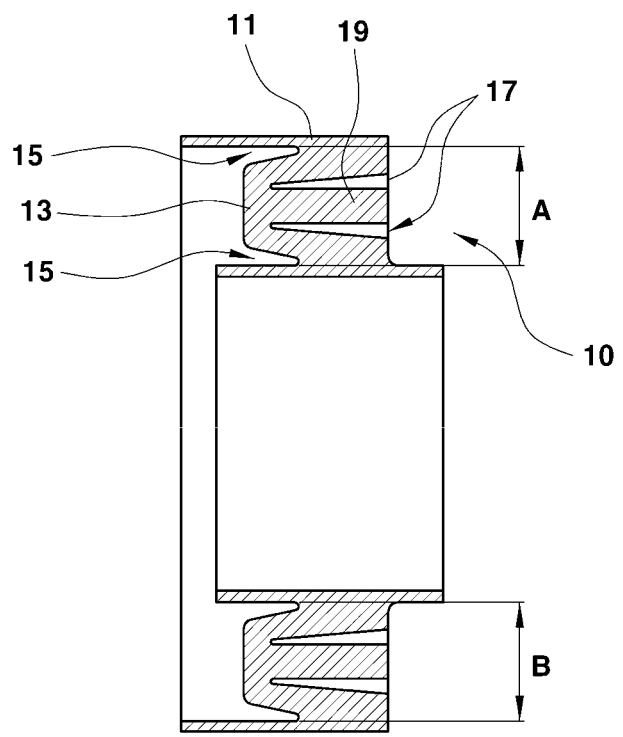
FIG. 3 is a sectional view showing the center bearing bush unit of FIG. 2.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a center bearing bush unit for a propeller shaft, which can improve the amount of large/small displacement of the propeller shaft, caused during driving of a vehicle. In the present invention, a multi-level insulation characteristic zone is implemented, so that it is possible to effectively decrease vibrations of various displacements from a small-displacement vibration occurring during driving to a large-displacement vibration occurring in oscillation.

Figure 4:
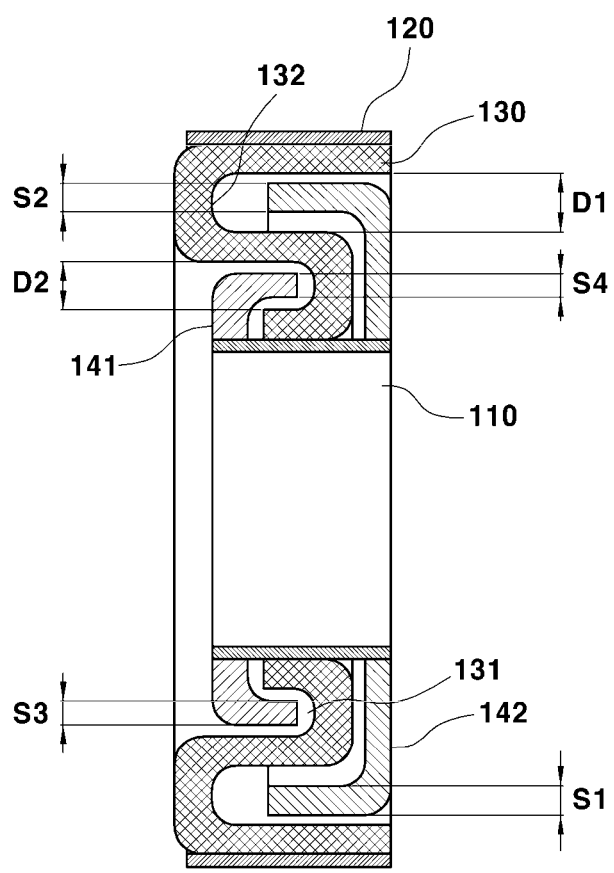
FIG. 4 is a sectional configuration view showing an exemplary center bearing bush unit for a propeller shaft according to the present invention.
Figure 5A:
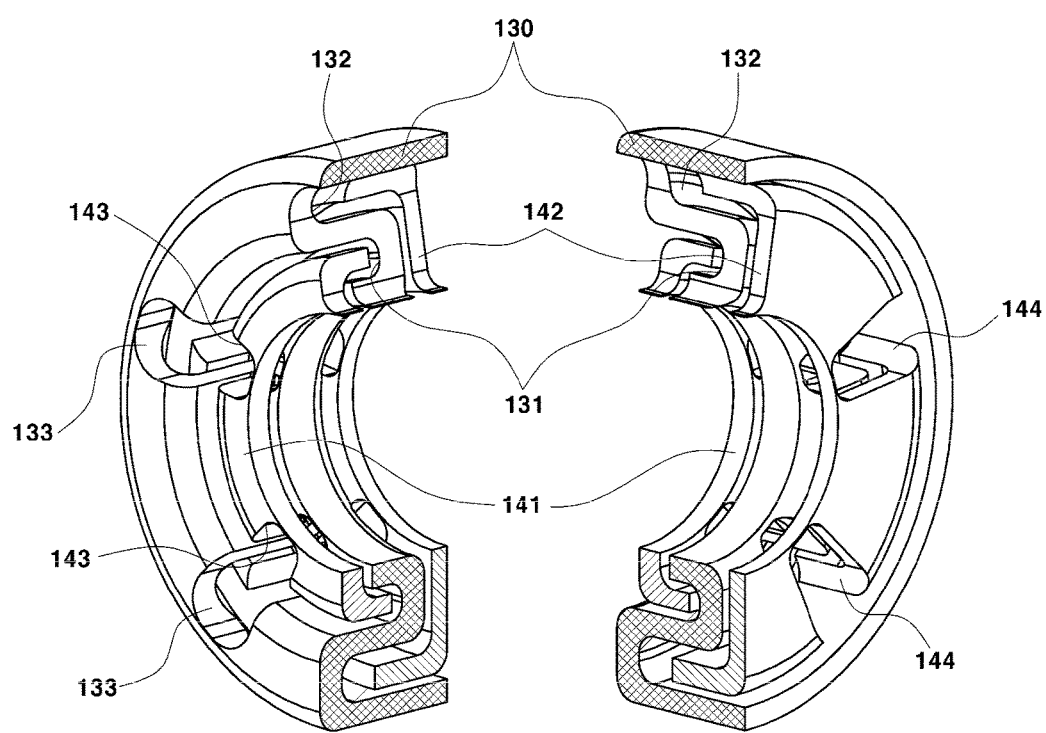
FIG. 5A is a partial perspective view showing an exemplary divided center bearing bush unit for a propeller shaft according to the present invention.
Figure 5B:
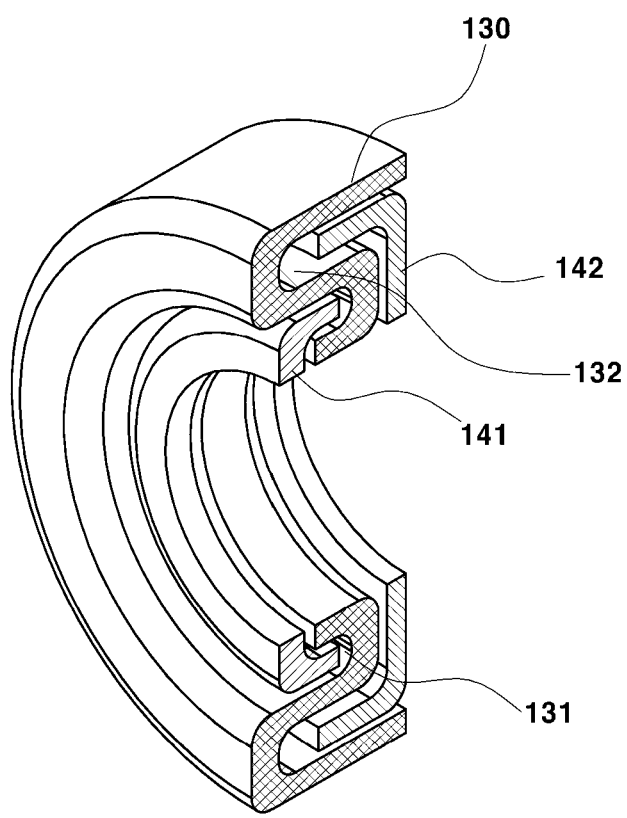
FIG. 5B is a partial perspective view showing a basic structure of the center bearing bush unit of FIG. 4.

FIG. 4 is a sectional configuration view showing a center bearing bush unit for a propeller shaft according to various embodiments of the present invention. FIG. 5A is a partial perspective view showing the divided center bearing bush unit for a propeller shaft of FIG. 4.

The center bearing bush unit of the present invention is provided in a circular ring shape having an opened center. As shown in FIG. 4, the center bearing bush unit includes an inner pipe 110, an outer pipe 120, and a cushion rubber 130 and stoppers 141 and 142, which are mounted between the inner and outer pipes 110 and 120.

The inner and outer pipes 110 and 120 are disposed on a common axis while being provided as hollow cylindrical pipes. The inner pipe 110 is positioned inside the outer pipe 120.

Although shown in this figure, in order to insulate the displacement movement of a propeller shaft, caused during driving a vehicle, the inner pipe 110 is attached to the outer circumferential surface of a center bearing mounted on the propeller shaft, and the outer pipe 120 is attached to the inner circumferential surface of a mounting bracket coupled to a vehicle body while surrounding the center bearing.

In this case, the center bearing supports the propeller shaft to be rotatable with respect to the vehicle body, and the mounting bracket is attached to the outer circumferential surface of the outer pipe 120 so as to fix the outer pipe 120 to the vehicle body.

That is, the center bearing bush unit of the present invention is configured between the center bearing mounted on the propeller shaft and the mounting bracket fixing the center bearing to the vehicle body so as to insulate vibrations of the propeller shaft.

The inner circumferential surface of the cushion rubber 130 is attached to the outer circumferential surface of the inner pipe 110, and the outer circumferential surface of the cushion rubber 130 is attached to the inner circumferential surface of the outer pipe 120. The cushion rubber 130 always supports the load acting between the inner and outer pipes 120.

The cushion rubber 130 has at least one void in order to effectively insulate a small-displacement vibration caused during driving, and may have a plurality of voids.

As shown in FIGS. 4 and 5A, the void of the cushion rubber 130 has a shape in which the cushion rubber 130 is bent in a predetermined direction at every section in the radial direction. Thus, the void of the cushion rubber 130 is an empty space formed at the bent portion. The void of the cushion rubber 130 may be formed with an inner void 131 and an outer void 132, which are disposed on a common axis.

The inner void 131 may be formed in the shape of a circular ring adjacent to the inner circumferential surface of the cushion rubber 130, and the outer void 132 may be formed in the shape of a circular ring adjacent to the outer circumferential surface of the cushion rubber 130.

Figure 6A:
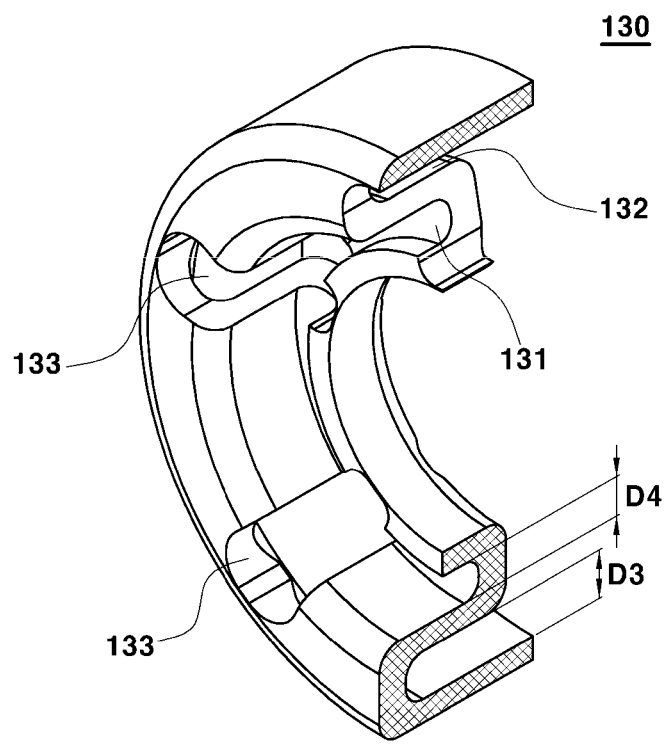
FIG. 6A and FIG. 6B are a partial perspective and side views, respectively, showing a cushion rubber of FIG. 4 and FIG. 5A.

In this case, the inner and outer voids 131 and 132 may be formed to different widths (see D1 and D2 of FIG. 4), or may be formed to have the same width (see D3 and D4 of FIG. 6A).

That is, the plurality of voids provided in the cushion rubber 130 may be formed to have the same width, or may be formed to have selected two or more different widths.

In various embodiments and as shown in FIG. 4, the outer void 132 is formed to have a width greater than that of the inner void 131.

In this case, the inner and outer voids 131 and 132 have one sides opened toward the opposite directions to each other, based on the axis line direction of the cushion rubber 130. The stoppers 141 and 142 are partially inserted through the opened one side of the void.

The stoppers 141 and 142 are configured to effectively insulate a large-displacement vibration caused during driving of the vehicle. The stoppers 141 and 142 may be configured with at least one stopper, and may be configured in plural numbers.

As shown in FIGS. 4 and 5A, the stopper 141 and 142 may be configured with inner and outer stoppers 141 and 142 having different diameters.

Figure 7A:
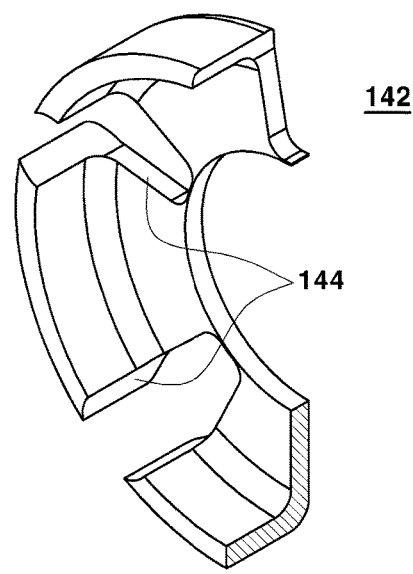
FIG. 7A and FIG. 7B are partial views showing outer and inner stoppers, respectively, of FIG. 4 and FIG. 5A.

The inner and outer stoppers 141 and 142 are provided in the shape of an approximately circular ring. Each of the inner and outer stoppers 141 and 142 has a sectional structure in which the stopper is bent in a '¬' shape as shown in FIG. 7.

One end portion of the inner stopper 141 is inserted into the inner void 131 of the cushion rubber 130 in a state in which the inner circumferential surface of the inner stopper 141 is attached to the outer circumferential surface of the inner pipe 110. One end portion of the outer stopper 142 is inserted into the outer void 132 of the cushion rubber 130 in a state in which the inner circumferential surface of the outer stopper 142 is attached to the outer circumferential surface of the inner pipe 110.

In this case, the inner stopper 141 is positioned to be spaced apart from the cushion rubber 130 and the wall surface of the inner void 131 at a predetermined interval. The outer stopper 142 is positioned to be spaced apart from the cushion rubber 130 and the wall surface of the outer void 132.

The inner and outer stoppers 141 and 142 may be formed to have different thicknesses (see Si and S3 of FIG. 4), or may be formed to the same thickness.

In various embodiments and as shown in FIG. 4, the outer stopper 142 is formed to have a thickness thicker than that of the inner stopper 141 (S1>S3).

As described above, in the present invention, the number of the voids 131 and 132 formed in the cushion rubber 130, the shape of each void, and the number and shape of the stoppers 141 and 142 may vary. Accordingly, the rigidity characteristic zone of the center bearing bush unit can be subdivided and expanded, thereby effectively insulating vibrations.

For example, in the present invention, the rigidity characteristic of the center bearing bush unit can be set to be subdivided/multi-leveled according to displacement conditions of vibrations input to the propeller shaft, such as when a contact between the cushion rubber 130 and the stopper 141 and 142 does not occur, when a contact of the inner stopper 141 with the wall surface of the inner void 131 occurs, and when a contact of the outer stopper 142 with the wall surface of the outer void 132 occurs.

The center bearing bush unit configured as described above may be configured into a structure having openings as shown in FIG. 5A, or may be configured into a basic structure having no opening.

In a case where it is required to differently implement insulation characteristics in the vertical or lateral direction depending on a change in operational environment of the center bearing bush unit mounted in the vehicle, openings 133, 143 and 144 may be formed in the cushion rubber 130 and the stoppers 141 and 142 as shown in FIGS. 5A, 6A, 6B, 7A, and 7B.

Figure 6B:
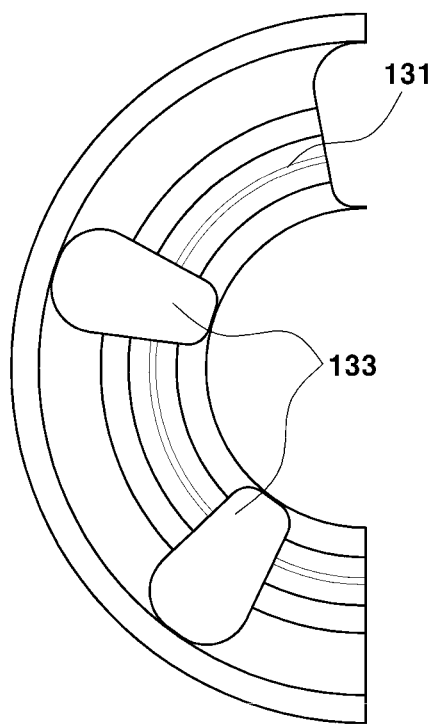

For example, the cushion rubber 130 may have a plurality of openings 133 arranged along the circumferential direction thereof As shown in FIGS. 6A and 6B, the opening 133 may be formed into a structure punched in the wall surface of the cushion rubber surrounding the inner void 131.

In this case, the opening 133 may have a structure opened at an end of the inner circumferential surface (portion attached to the outer circumferential surface of the inner pipe 110) of the cushion rubber 130.

For example, at least one of the inner and outer stoppers 141 and 142 may have a plurality of openings 143 and 144 arranged along the circumferential surface thereof.

Figure 7B:
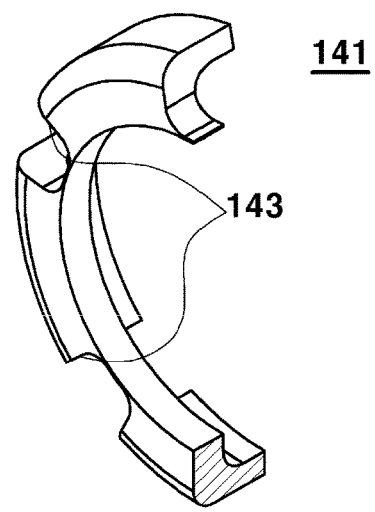

As shown in FIG. 7B, the opening 143 of the inner stopper 141 may be punched into the sectional structure of a 'L' shape by being extended from the inner circumferential surface of the inner stopper 141, attached to the outer circumferential surface of the inner pipe 110, to one end portion of the inner stopper 141, inserted into the inner void 131 of the cushion rubber 130, and the opening 144 of the outer stopper 142 may be punched into the sectional structure of a '¬' shape by being extending from the inner circumferential surface of the outer stopper 142, attached to the outer circumferential surface of the inner pipe 110, to one end portion of the outer stopper 142, inserted into the outer void 132 of the cushion rubber 130.

In this case, one side of the opening 143 of the inner stopper 141, inserted into the inner void 131 of the cushion rubber 130, may be opened, and one side of the opening 144 of the outer stopper 142, inserted into the outer void 132 of the cushion rubber 130, may be opened.

The plurality of openings 133, 143 and 144 arranged in the circumferential directions in the cushion rubber 130 and the stoppers 141 and 142 may be formed into the same structure, or may be formed into different structures when necessary.

In addition, the plurality of openings 133, 143 and 144 arranged in the circumferential directions in the cushion rubber 130 and the stoppers 141 and 142 may be arranged at the same interval, or may be arranged at different intervals.

Figure 8:
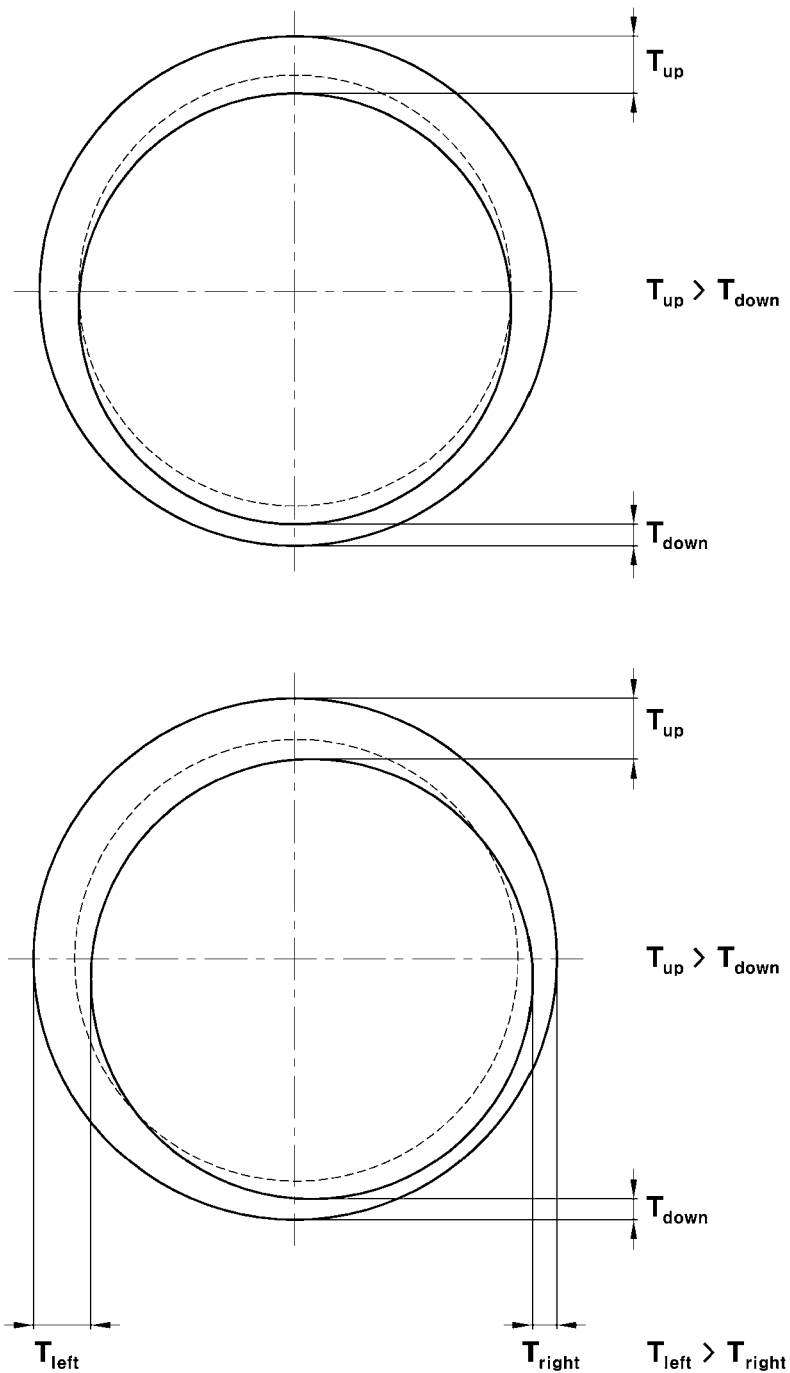
FIG. 8 is an exemplary view showing shapes obtained by variably applying the thickness of the cushion rubber in a circumferential direction according to the present invention.

FIG. 8 is a schematic view showing shapes obtained by variably applying the thickness of the cushion rubber in a circumferential direction according to the present invention.

In a case where a change in insulation characteristic is required due to a change in operational environment of the center bearing bush unit mounted in the vehicle, the required insulation characteristic may be implemented by tuning the thicknesses of the cushion rubber 130 and the stoppers 141 and 142.

For example, in a case where the insulating characteristic of the center bearing bush unit is differently implemented along the circumferential direction due to a change in operational environment, the thicknesses Tup, Tdown, Tleft and Tright of the cushion rubber may be formed to increase/decrease by being varied along the circumferential direction as shown in FIG. 8.

The stopper of the thicknesses of the stopper may also be formed to increase/decrease by being varied along the circumferential direction, so that the insulation characteristic of the center bearing bush unit can be variably implemented along the circumferential direction.

In other words, the thicknesses of any one or both of the cushion rubber 130 and the stoppers 141 and 142 may be variably formed along the circumferential direction, so that the insulation characteristic of the center bearing bush unit can be variably implemented along the circumferential direction.

That is, the thicknesses of any one or both of the cushion rubber 130 and the stopper 141 and 142 are varied, so that the insulation characteristic of the center bearing bush unit can be varied.

Thus, each of the cushion rubber 130 and the stopper 141 and 142 may have a constant thickness in the circumferential direction, or may have a variable thickness in the circumferential direction.

Figure 9:
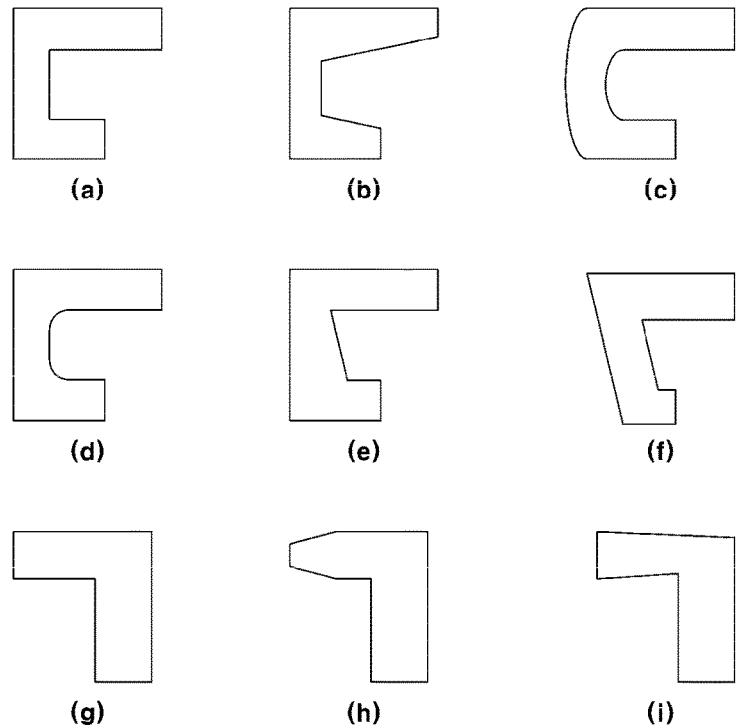
FIG. 9 is an exemplary view showing exemplary voids of cushion rubbers (a) through (i) and applications of the stopper according to the present invention.

FIG. 9 is an exemplary view showing voids of the cushion rubber and applications of the stopper according to the present invention.

As described above, the voids 131 and 132 are formed in the cushion rubber 130 in order to reduce the amount of small-displacement movement caused during driving of the vehicle and to decrease vibration transmissibility. Therefore, as shown in FIGS. 9 (a) to (f), the void may be formed to have various sectional structures including a quadrangular shape, a trapezoid shape, a quadrangular shape having a round end, a quadrangular shape having a sloped end, etc. The void may also have a sectional structure having a triangular shape.

As shown in (g) to (i) of FIG. 9, the shape of the stopper 141 and 142 is variously modified and applied to a sectional structure having a simple quadrangular end, a sectional structure having a quadrangular shape of which end is gradually narrowed, a sectional structure having a quadrangular shape of which end is gradually widened, etc. in order to reduce the amount of small-displacement movement caused during driving of the vehicle and to decrease the vibration transmissibility. Accordingly, the insulation characteristic of the center bearing bush unit can be implemented to cope with a change in operational environment.

As described above, in the present invention, the cushion rubber and the stopper for vibration insulation of the propeller shaft are independently configured, and the shapes of the cushion rubber and the stopper are simplified, so that the void of the cushion rubber and the shape of the stopper can be variously applied according to a desired vibration insulation characteristic or rigidity characteristic. In addition, the stopper is configured in plural numbers, so that the durability of the center bearing bush unit can be maintained identical to or more than that of the existing center bearing bush units.

Further, in the present invention, the fillet radius of the bent portion of each of the cushion rubber and the stopper can be adjusted, thereby improving the durability of the center bearing bush unit. Accordingly, the amount of displacement caused by the weight of the propeller shaft is absorbed, so that it is possible to improve vibration insulation after the propeller shaft is mounted in the vehicle.

That is, in the present invention, a plurality of voids and a plurality of stoppers are used as variables and conditions for changing the vibration insulation characteristic, and a wide rigidity characteristic zone is implemented, so that it is possible to cope with vibrations of various displacements from a small-displacement vibration occurring during driving to a large-displacement vibration occurring in oscillation, thereby improving the vibration insulation performance of the center bearing bush unit.

Figure 10:
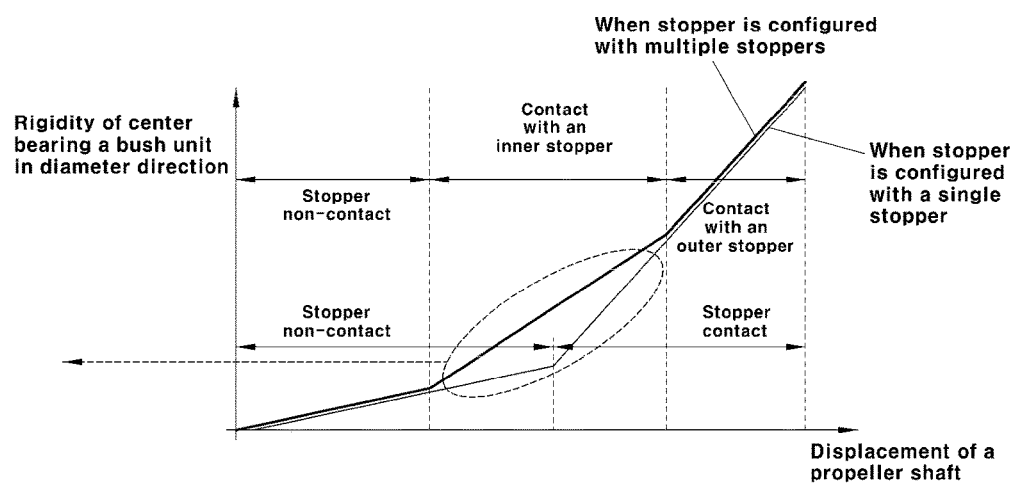
FIG. 10 is a graph showing a rigidity of the center bearing bush unit in the diameter direction according to the present invention.

FIG. 10 is a graph showing a rigidity of the center bearing bush unit in the diameter direction according to various embodiments of the present invention.

As shown in FIG. 10, in a case where the stopper is configured with a single stopper, the center bearing bush unit has a two-step characteristic zone through a stopper non-contact and a stopper contact. In a case where the stopper is configured with inner and outer stoppers, the center bearing bush unit has at least a three-step characteristic zone through a stopper non-contact, an inner stopper contact, an outer stopper contact, etc. Accordingly, when a vibration occurs in the propeller shaft, the rigidity characteristic zone is subdivided and more widely formed, thereby effectively insulating vibrations.

For example, when a middle-displacement vibration occurs, the rigidity is low in the existing center bearing bush unit, and therefore, it is impossible to perform an effective displacement control. However, in the present invention, the rigidity characteristic zone is more widely subdivided, and thus it is possible to cope with the middle-displacement vibration.

In addition to the tuning and changing of the shapes of the cushion rubber and the stopper so as to vary the vibration insulation characteristic as described above, it is possible to vary a characteristic of decreasing the amount of small-displacement vibration by changing the material of the cushion rubber, and it is possible to vary a characteristic of decreasing the amount of large-displacement vibration by changing the material of the stopper.

In this case, the shapes and materials of the cushion rubber and the stopper can be independently designed/tuned, and thus the freedom degree in designing and tuning the center bearing bush unit is improved. Accordingly, it is possible to rapidly cope with a variable situation such as a change in bending angle of the propeller shaft due to a change in mounting position or layout when the center bearing bush unit is mounted in the vehicle. Further, it is possible to shorten a development period of the center bearing bush unit and to reduce developing cost of the center bearing bush unit.

Meanwhile, various embodiments capable of performing functions equal to those of the aforementioned embodiment shown in FIG. 4 will be described.

Figure 11:
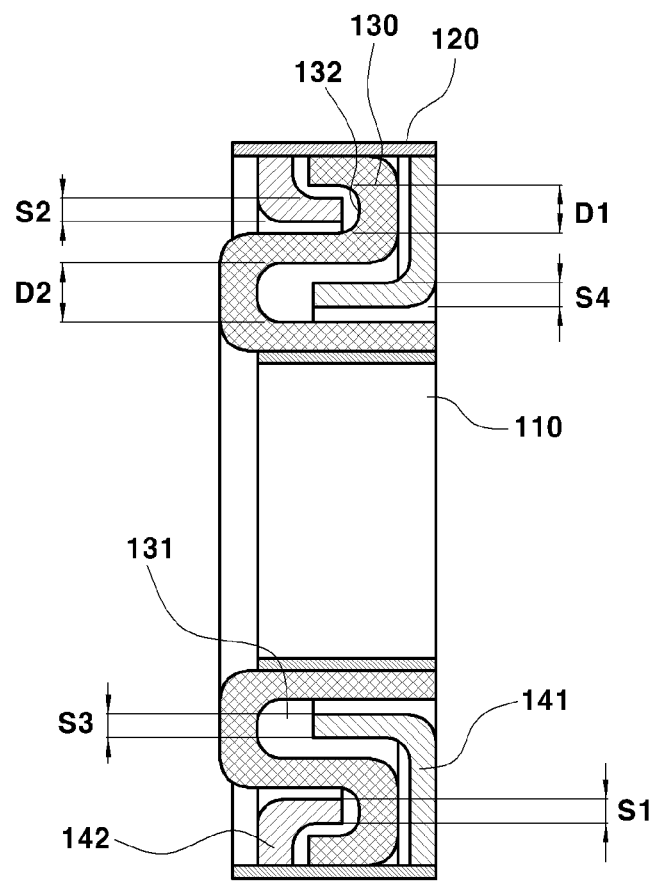
FIG. 11 is a sectional configuration view showing an exemplary center bearing bush unit for a propeller shaft according to the present invention.

FIG. 11 is a sectional configuration view showing a center bearing bush unit for a propeller shaft according to various embodiments of the present invention.

As shown in FIG. 11, the center bearing bush unit according to various embodiments of the present invention may be configured into a structure in which inner and outer stoppers 141 and 142 are attached to the inner circumferential surface of an outer pipe 120.

Specifically, the center bearing bush unit may include an inner pipe 110, an outer pipe 120 disposed on a common axis as the inner pipe 110 at the outside of the inner pipe 110, a cushion rubber 130 attached between the inner and outer pipes 110 and 120 and having inner and outer voids 131 and 132 disposed on a common axis, and inner and outer stoppers 141 and 142 attached to the inner circumferential surface of the outer pipe 120 while being spaced apart from the cushion rubber 130 at a predetermined interval.

Like the aforementioned embodiments, the inner and outer voids 131 and 132 may be formed to have the same width (D1 and D2), or may be formed to have different widths (D1 and D2).

In this case, the inner void 131 is formed adjacent to the inner circumferential surface of the cushion rubber 130, and the outer void 132 is formed adjacent to the outer circumferential surface of the cushion rubber 130.

The inner and outer stoppers 141 and 142 are formed to have different inside diameters. One end portion of the inner stopper 141 is inserted into the inner void 131 of the cushion rubber 130 in a state in which the outer circumferential surface of the inner stopper 141 is attached to the inner circumferential surface of the outer pipe 120. One end portion of the outer stopper 142 is inserted into the outer void 132 of the cushion rubber 130 in a state in which the outer circumferential surface of the outer stopper 142 is attached to the inner circumferential surface of the outer pipe 120.

In this case, the inner and outer stoppers 141 and 142 may be formed to have different thicknesses (S1 and S3) (S2 and S4), or may be formed to have the same thickness S1 and S3) (S2 and S4).

Figure 12:
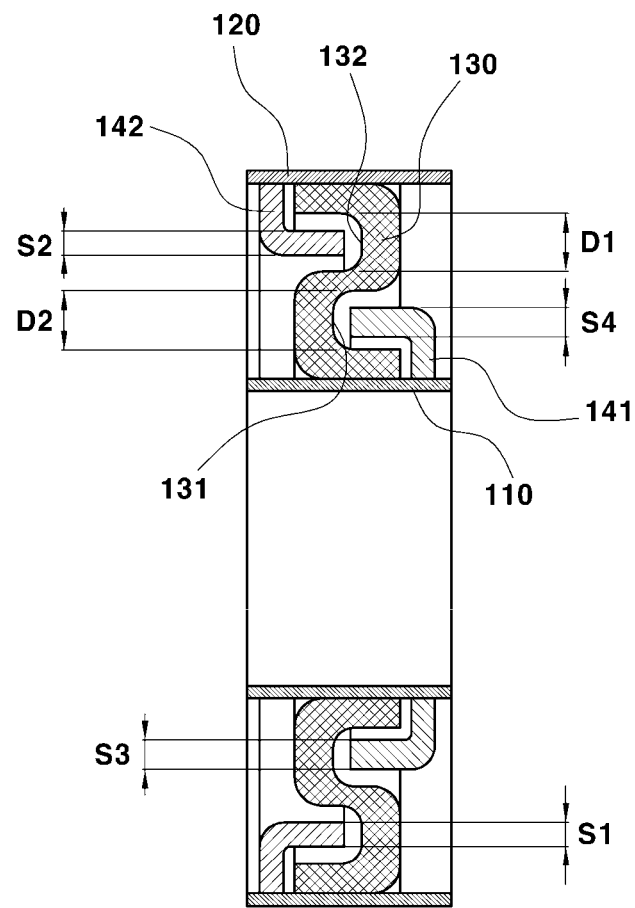
FIG. 12 is a sectional configuration view showing an exemplary center bearing bush unit for a propeller shaft according to the present invention.
Figure 13:
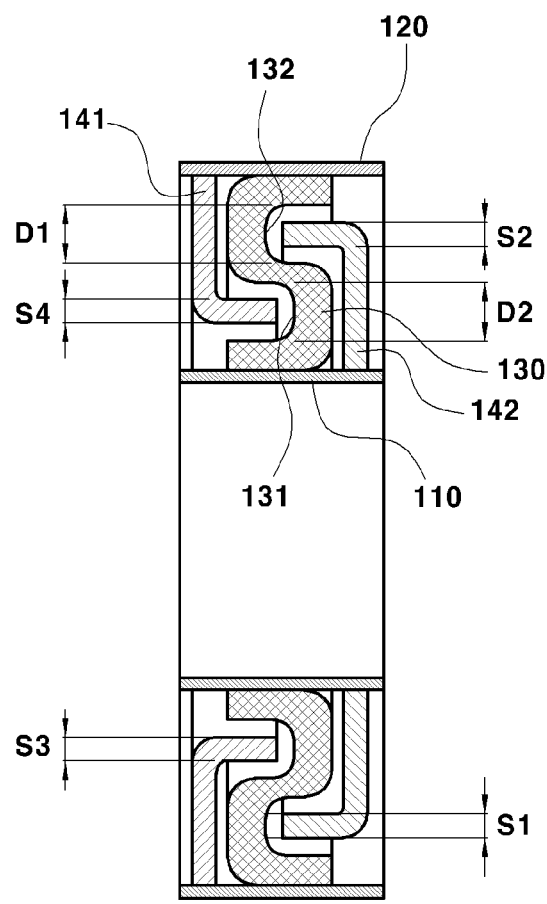
FIG. 13 is a sectional configuration view showing an exemplary center bearing bush unit for a propeller shaft according to the present invention.

FIG. 12 is a sectional configuration view showing a center bearing bush unit for a propeller shaft according to various embodiments of the present invention. FIG. 13 is a sectional configuration view showing a center bearing bush unit for a propeller shaft according to other embodiments of the present invention.

As shown in FIG. 12, the center bearing bush unit may be configured into a structure in which an inner stopper 141 is attached to the outer circumferential surface of an inner pipe 110, and an outer stopper 142 is attached to the inner circumferential surface of an outer pipe 120.

Specifically, the center bearing bush unit may include an inner pipe 110, an outer pipe 120 disposed on a common axis as the inner pipe 110 at the outside of the inner pipe 110, a cushion rubber 130 attached between the inner and outer pipes 110 and 120 and having inner and outer voids 131 and 132 disposed on a common axis, and inner and outer stoppers 141 and 142 disposed while being spaced apart from the cushion rubber 130 at a predetermined interval. Here, the outer stopper 142 is attached to the inner circumferential surface of the outer pipe 120, and the inner stopper 141 is attached to the outer circumferential surface of the inner pipe 110.

In this case, one end portion of the inner stopper 141 is inserted into the inner void 131 of the cushion rubber 130 in a state in which the inner circumferential surface of the inner stopper 141 is attached to the outer circumferential surface of the inner pipe 110, and one end portion of the outer stopper 142 is inserted into the outer void 132 of the cushion rubber 130 in a state in which the outer circumferential surface of the outer stopper 142 is attached to the inner circumferential surface of the outer pipe 120.

As shown in FIG. 13, the center bearing bush unit may be configured into a structure in which an inner stopper 141 is attached to the inner circumferential surface of an outer pipe 120, and an outer stopper 142 is attached to the outer circumferential surface of the inner pipe 110.

Specifically, the center bearing bush unit may include an inner pipe 110, an outer pipe 120 disposed on a common axis as the inner pipe 110 at the outside of the inner pipe 110, a cushion rubber 130 attached between the inner and outer pipes 110 and 120 and having inner and outer voids 131 and 132 disposed on a common axis, and inner and outer stoppers 141 and 142 disposed while being spaced apart from the cushion rubber 130 at a predetermined interval. Here, the outer stopper 142 is attached to the outer circumferential surface of the inner pipe 110, and the inner stopper 141 is attached to the inner circumferential surface of the outer pipe 120.

In this case, one end portion of the inner stopper 141 is inserted into the inner void 131 of the cushion rubber 130 in a state in which the outer circumferential surface of the inner stopper 141 is attached to the inner circumferential surface of the outer pipe 120, and one end portion of the outer stopper 142 is inserted into the outer void 132 of the cushion rubber 130 in a state in which the inner circumferential surface of the outer stopper 142 is attached to the outer circumferential surface of the inner pipe 110.

Like the aforementioned embodiments, in the center bearing bush units shown in FIGS. 12 and 13, the inner and outer voids 131 and 132 may be formed to have the same width (D1 and D2), or may be formed to have different widths (D1 and D2).

In this case, the inner void 131 is formed adjacent to the inner circumferential surface of the cushion rubber 130, and the outer void 132 is formed adjacent to the outer circumferential surface of the cushion rubber 130.

In addition, the inner and outer stoppers 141 and 142 may be formed to have different thicknesses (S1 and S3), or may be formed to have the same thickness (S1 and S3).

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center bearing bush unit for a propeller shaft, comprising:
    an inner pipe;
    an outer pipe disposed on a common axis with the inner pipe at an outside of the inner pipe;
    a cushion rubber attached between the inner and outer pipes, and having a plurality of voids disposed on the common axis, wherein the plurality of voids includes an inner void and an outer void; and
    a plurality of stoppers attached to an inner circumferential surface of the outer pipe while being spaced apart from the cushion rubber at a predetermined interval,
    wherein the plurality of stoppers includes an inner stopper and an outer stopper having different inside diameters, and wherein a first end portion of the inner stopper is inserted into the inner void of the cushion rubber in a state in which an outer circumferential surface of the inner stopper is attached to the inner circumferential surface of the outer pipe, and a first end portion of the outer stopper is inserted into the outer void of the cushion rubber in a state in which an outer circumferential surface of the outer stopper is attached to the inner circumferential surface of the outer pipe,
    wherein each distal end of the outer stopper and the inner stopper is curved in a parallel direction of the common axis toward the cushion rubber to form the first end portions of the inner and outer stoppers respectively so that each first end portion of the inner and outer stoppers is inserted into the corresponding inner and outer voids, respectively, and
    wherein the inner stopper and the outer stopper are configured to selectively contact the cushion rubber.

2. The center bearing bush unit of claim 1, wherein the inner and outer voids provided in the cushion rubber are formed with two or more different widths.

3. The center bearing bush unit of claim 1, wherein the inner void is disposed adjacent to an inner circumferential surface of the cushion rubber, and the outer void is disposed adjacent to an outer circumferential surface of the cushion rubber.

4. The center bearing bush unit of claim 1, wherein the inner and outer stoppers are formed with an identical thickness.

* * * * *